United States Patent [19]

Brattain

[11] Patent Number: 4,586,263
[45] Date of Patent: May 6, 1986

[54] PENDULUM LEVEL

[76] Inventor: Charles E. Brattain, 1224 S. Minister Dr., Tucker, Ga. 30084

[21] Appl. No.: 712,381

[22] Filed: Mar. 15, 1985

[51] Int. Cl.$^4$ .............................................. G01C 9/12
[52] U.S. Cl. ........................................ 33/353; 33/391
[58] Field of Search ................... 33/353, 391, 398–400, 33/395, 370–375, 340, 341, 343, 349, 451, 295

[56] References Cited

U.S. PATENT DOCUMENTS

| 732,614 | 6/1903 | Binkerd | 33/353 X |
| 753,354 | 3/1904 | Brown | 33/353 X |
| 839,662 | 12/1906 | Smith | 33/391 |
| 2,068,017 | 1/1937 | Given | 33/365 |

FOREIGN PATENT DOCUMENTS 386708  7/1965  Switzerland ........................... 33/391

Primary Examiner—Harry N. Haroian
Attorney, Agent, or Firm—George W. T. Loo

[57] ABSTRACT

A pendulum level which is a combination pendulum and level. It includes a rectangular frame with no back and front panels and two spaced cross bars, a pendulum that is pivotally secured to one of the cross bars and detachably secured to the other cross bar, and a level which is adjustably secured to the side of the frame. The location of the pivot point of the pendulum and the use of a longer and heavier pendulum allows the pendulum to swing freely yet quickly settle to the truly vertical. The pendulum type operation depends only on gravity for accuracy and will not get out adjustment as presently made levels do. A long vial is used in the level because it is more accurate, easier to see and use. The mounting system of the vial allows for the adjustment of the vial when it is not true. The vial is exposed for easy cleaning.

4 Claims, 7 Drawing Figures

U.S. Patent  May 6, 1986  4,586,263
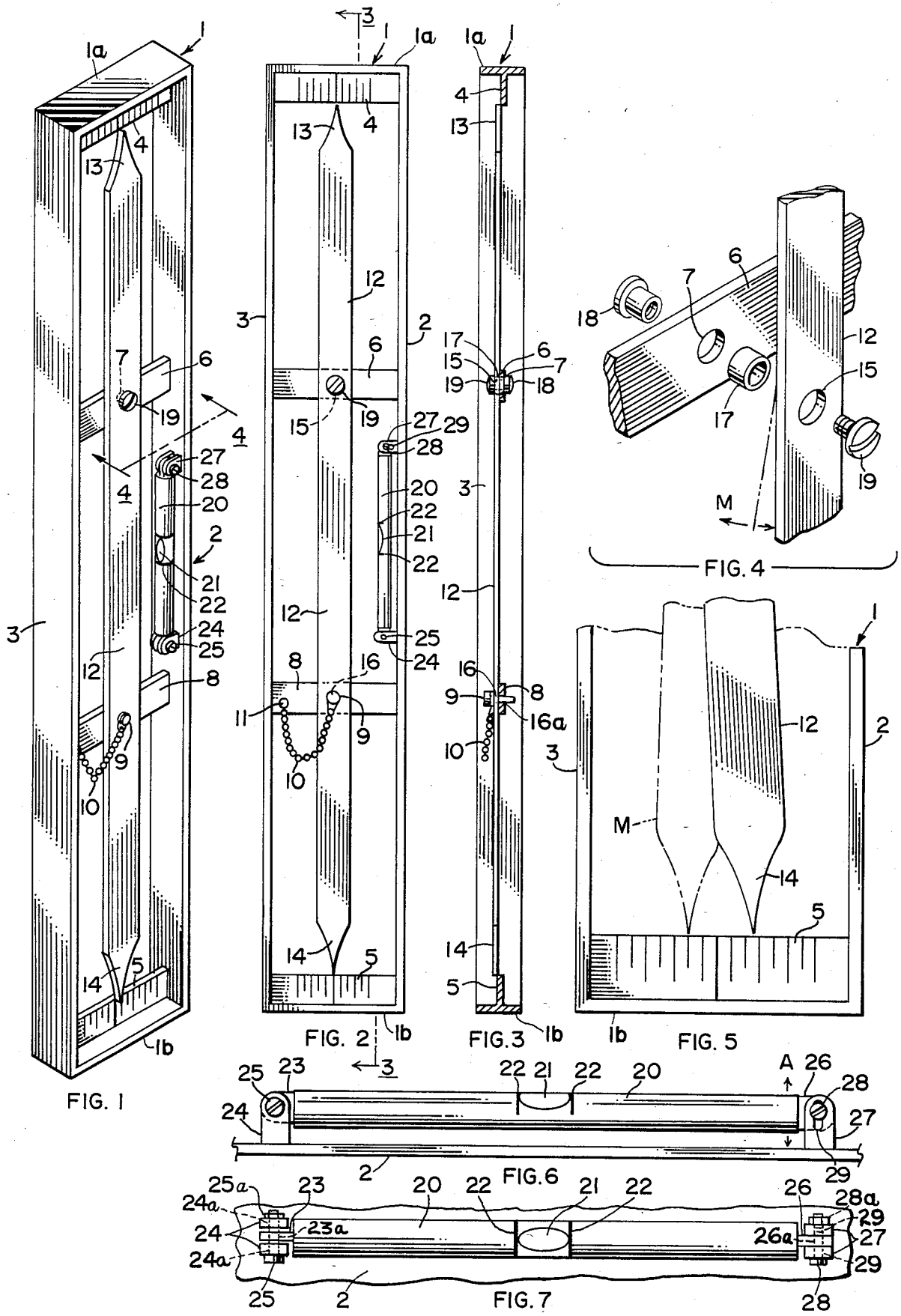

1

PENDULUM LEVEL

BACKGROUND OF THE INVENTION

1. Field of Invention.

This invention relates to plumbing and leveling devices.

2. Description of the Prior Art.

Most levels have one or more vials for leveling and one or more vials for plumbing. The vials are presently mounted by cementing in place or by a series of adjustable screws which are literally impossible to true up once they get out of adjustment. Moreover, when the vials are enclosed in a glass or clear plastic case, they become difficult to use when the inside of the glass or plastic case become dusty or clouded. My invention is a combination pendulum and level which works quickly and accurately. In essence, my invention drastically improves the carpenter's level.

Disclosure Statement.

Durst, U.S. Pat. No. 898,853, issued Sept. 18, 1908, discloses gravity leveling plumbing attachment to a square to indicate the position of an article with respect to the perpendicular. The attachment includes a pivot shank having one portion provided with a knife edge 9, the remaining portion being threaded as shown at 10. A head 11 is carried by one end of the shank, an abutment 12 is located on an intermediate portion of the shank, and a clamping nut 17 is screwed upon the threaded portion 10 of the shank. An indicator is journaled on the knife edge portion 9 and is in the form of a weighted pointer member having a long and comparatively heavy arm 13, an enlarged circular portion 15 having an opening that receives the knife edge portion of the shank, and a short pointed arm 14. The arm carrying the indicator is arranged in an upright position and one of its straight edge applied to the article. Inasmuch as the indicator can swing freely, the relation of the article to the perpendicular will be indicated by the pointer arm 14 upon scale 8. The device may also be employed for leveling by placing the other arm upon the article to be leveled. Durst uses a square to determine the horizontal; a pendulum to determine the vertical.

My invention is one tool, not a combination of two tools. My invention has a longer, heavier pendulum for greater vertical accuracy and at least one long vial for greater horizontal accuracy. My invention is simple, clean, quick and positive. There are no unnecessary parts cluttering the appearance or operation. It works quickly and accurately.

SUMMARY OF THE INVENTION

This invention relates to a combination pendulum and level which works quickly and accurately to ascertain that a vertical plane is truly vertical and a horizontal plane is truly horizontal. The pendulum depends only on gravity for accuracy. The level is an adjustable long vial for greater accuracy.

An object of this invention is to provide a pendulum level which will ascertain if any vertical plane is truly vertical and any horizontal plane is truly horizontal.

Another object of this invention is to provide a pendulum level in which the pendulum type operation will not get out of adjustment as presently made levels do.

Still another object of this invention is to provide a pendulum level whose vertical measurements depend only on gravity.

A still further object of this invention is to provide a pendulum level with a longer than normal vial to determine the true horizontal.

Another object of this invention is to provide a pendulum level in which the long vial can be adjusted if it gets out of adjustment.

A further object of this invention is to provide a pendulum level whose pratically exposed vial can be easily cleaned when it gets dirty or dusty.

Still another object of this invention is to provide a pendulum level with calibrated markers at its top and bottom ends for instant and accurate readings.

Other objects, features and advantages of the present invention will be readily apparent from the following detailed description taken in connection with the accompanying drawing.

BRIEF DESCRIPTION OF THE DRAWING

FIG. 1 is a perspective view of the pendulum level.

FIG. 2 is a front elevational view of the pendulum level.

FIG. 3 is a sectional view of the pendulum level taken on line 3—3 of FIG. 2.

FIG. 4 is an enlarged partial exploded view of the pendulum and its pivot.

FIG. 5 is an enlarged partial front elevational view of bottom pointer, bottom scale, and bottom portion of rectangular frame.

FIG. 6 is an enlarged front elevational view of level vial, rotated 90° clockwise, and a portion of right side of frame.

FIG. 7 is an enlarged top plan view of level vial and right side of frame shown in FIG. 6.

Line 4—4 of FIG. 1 and its arrow indicate the general area shown in FIG. 4.

DESCRIPTION OF THE PREFERRED EMBODIMENT

Before explaining the present invention in detail it is to be understood that the invention is not limited in its application to the details of construction and arrangements of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing wherein like reference numerals refer to like and corresponding parts throughout the several views, the preferred embodiment of the invention disclosed in FIGS. 1–7 inclusive is a pendulum level.

Pendulum level includes frame 1, top scale 4, bottom scale 5, cross bar 6 with pivot opening 7, cross bar 8 with opening 16a, locking pin 9, chain 10, rivet 11, pendulum 12, and level vial 20.

Frame 1 includes top 1a, bottom 1b, right side 2, and left side 3. It is rectangular in shape with no back or front panels. Top scale 4 is located adjacent to top 1a; bottom scale 5 is located adjacent to bottom 1b. Cross bar 6 is secured to right side 2 and left side 3 approximately ⅓ the distance from top 1a. Cross bar 8 is secured to right side 2 and left side 3 approximately ⅓ the distance from bottom 1b.

Pendulum 12 inclues pivot opening 15, pin opening 16, top pointer 13, and bottom pointer 14. Top pointer 13 and bottom pointer 14 are similarly weighted. However, if it is deemed desirable only bottom pointer 14 may be weighted. Pendulum 12 is pivotally secured to cross bar 6 by means of bushing 17, female sex bolt 18, and male sex bolt 19. Bushing 17 is slightly longer than the combined thicknesses of pendulum 12 and cross bar 6. Opening 15 is slightly larger than bushing 17 in order for pendulum 12 to swing freely as indicated by reference letter M and arrows to show direction of movement in FIG. 4. Reference letter M in FIGS. 4 and 5 designates movement.

Pendulum 12 is detachably secured to cross bar 8 by means of locking pin 9 and openings 16 and 16a. Locking pin 9 is attached to cross bar 8 with chain 10 and rivet 11. Pendulum 12 is detachably secured to cross bar 8 when its use is not desired by placing locking pin 9 through openings 16 and 16a.

Level vial 20 includes bubble 21, markers 22, pivot end tab 23 with opening 23a, and adjustable end tab 26 with opening 26a. Level vial 20 is vertically secured to right side 2 by means of pivot end uprights 24 with openings 24a, bolt 25, nut 25a, adjustable end uprights 27 with slots 29, adjusting bolt 28, and nut 28a. See FIGS. 6 and 7. Whenever level vial 20 is out of adjustment, adjusting bolt 28 can be moved within slots 29 until bubble 21 is centered between markers 22, then tightened with nut 28a. Reference letter A in FIG. 6 designates adjustment of level vial 20 and arrows show direction of adjustment.

Level vial 20 is 4 inches to 6 inches in length. It may be made of glass or clear plastic. It is sealed at each end and filled with alcohol, chloroform, or other suitable liquid so that bubble 21 can be centered between markers 22. It is exposed so that it can be easily cleaned when dirty or dusty. Its longer length gives greater horizontal accuracy and makes it easier to see and use. The mounting of level vial 20 to right side 2 is unique in that one end is pivotally secured and the other end is adjustably secured in order to true up the level vial 20 when it gets out of adjustment.

The location of pivot opening 15 in pendulum 12 allows pendulum 12 to swing freely yet quickly settle to the truly vertical. Pendulum 12 depends only on gravity and needs no adjustment. Top scale 4 and bottom scale 5 give instant and accurate readings. Pendulum 12 is made longer and heavier for greater vertical accuracy.

Pendulum level may be manufactured in the same standard sizes as presently made levels. The most common lengths are 24", 30", 48", 72", 78", and 96". The preferred embodiment shows only one level vial for a 24" pendulum level. The 30" pendulum level will also have only one level vial. The 48" pendulum level will have two level vials and the longer length will have three level vials. The level vials are located where they would be easy to use. For example, on the 48" pendulum level, the level vials would be located next to the cross bars between the cross bars and the ends; on the 72" and 78" pendulum levels, one level vial would be located in the center of the pendulum level and one level vial would be located approximately 16" from each end; and on the 96" pendulum level, one level vial would be located in the center of the pendulum level and one level vial would be located approximately 24" from each end.

To ascertain if a vertical plane is truly vertical the pendulum level is placed against the vertical plane. If the vertical plane is truly vertical top pointer 13 and bottom pointer 14 will point to the center mark on top scale 4 and bottom scale 5, respectively. If the vertical plane is not truly vertical the top and bottom pointers will indicate this by pointing off center on their respective scales.

To ascertain if a horizontal plane is truly horizontal the right side of the pendulum level is placed against the horizontal plane. If the horizontal plane is truly horizontal bubble 21 will be centered between markers 22.

My invention is a simple, clean, quick, and positive tool. There are no unnecessary parts cluttering the appearance or operation. It works quickly and accurately. The location of the pivot point in my longer, heavier pendulum allows the pendulum to swing freely yet quickly settle to the truly vertical. The pendulum type operation depends only on gravity and will not get out of adjustment as presently made levels do. I use a longer level vial because a longer vial is more accurate, easier to see and use. The level vial is exposed for easy cleaning. My mounting of the level vial is unique in that one end is pivotally secured and the other end is adjustably secured in order to true up the level vial when it gets out of adjustment. An operator experienced in the use of levels as they are presently manufactured will find my invention to be a drastic improvement over existing levels.

Although but a single embodiment of the invention has been disclosed and described herein, it is obvious that many changes may be made in the size, shape, arrangements, color and detail of the various elements of the invention without departing from the scope of the novel concepts of the present invention.

I claim as my invention:

1. A pendulum level comprising a frame with two spaced cross bars, a scale near the top and bottom of the frame, a pendulum, a level, means to pivotally secure the pendulum to one of the cross bars, means to detachably secure the pendulum to the other cross bar, and means to adjustably secure the level to a side of the frame; and the means to pivotally secure the pendulum to one of the cross bars include a bushing and a sex bolt and openings in pendulum and the cross bar, the bushing is slightly longer than the combined thicknesses of the pendulum and the cross bar, and the opening in the pendulum is slightly larger than the bushing.

2. The pendulum level of claim 1, wherein the means to detachably secure the pendulum to the other cross bar include a locking pin and openings in pendulum and the other cross bar, the locking pin is attached to the other cross bar by means of a chain and a rivet in the other cross bar.

3. The pendulum level of claim 2, wherein the means to adjustably secure the level to a side of the frame include pivot end uprights and adjustable end uprights that are attached to the side of the frame at a distance from each other, two bolts, and two nuts, the pivot end uprights have openings through which one of the two bolts passes through, and the adjustable end uprights have slots through which the other bolt passes through.

4. The pendulum level of claim 3, wherein the level includes a long vial with a pivot end tab at one end and an adjustable end tab at the other end, each tab has an opening through which the bolts pass through.

* * * * *